Sept. 5, 1933. G. A. LONG 1,925,723
KEY CUTTING MACHINE
Filed Jan. 20, 1928 6 Sheets-Sheet 1
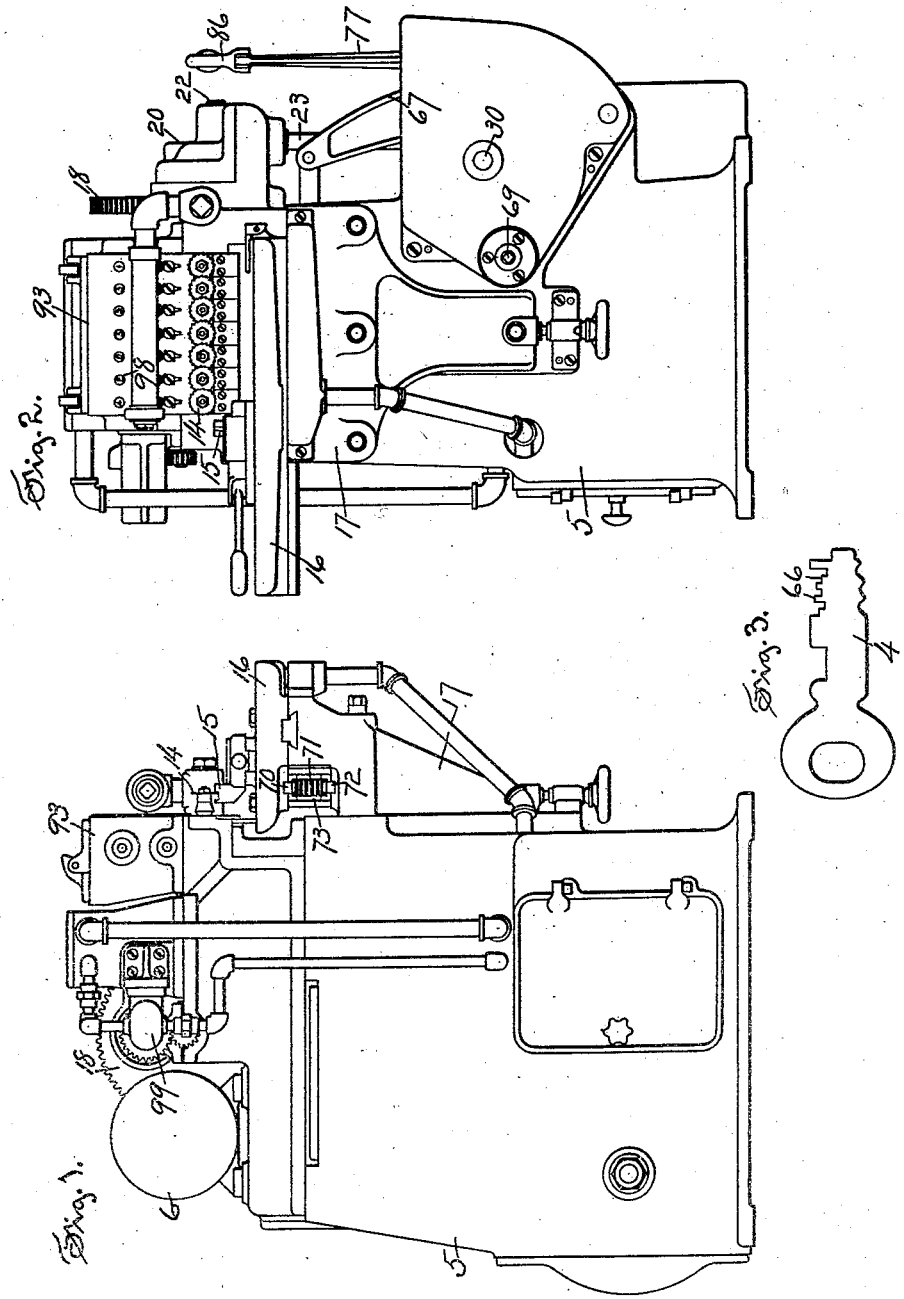
INVENTOR
George A. Long,
by Arthur Jenkins,
ATTORNEY Sept. 5, 1933.                G. A. LONG                 1,925,723
                          KEY CUTTING MACHINE
                 Filed Jan. 20, 1928        6 Sheets-Sheet 2
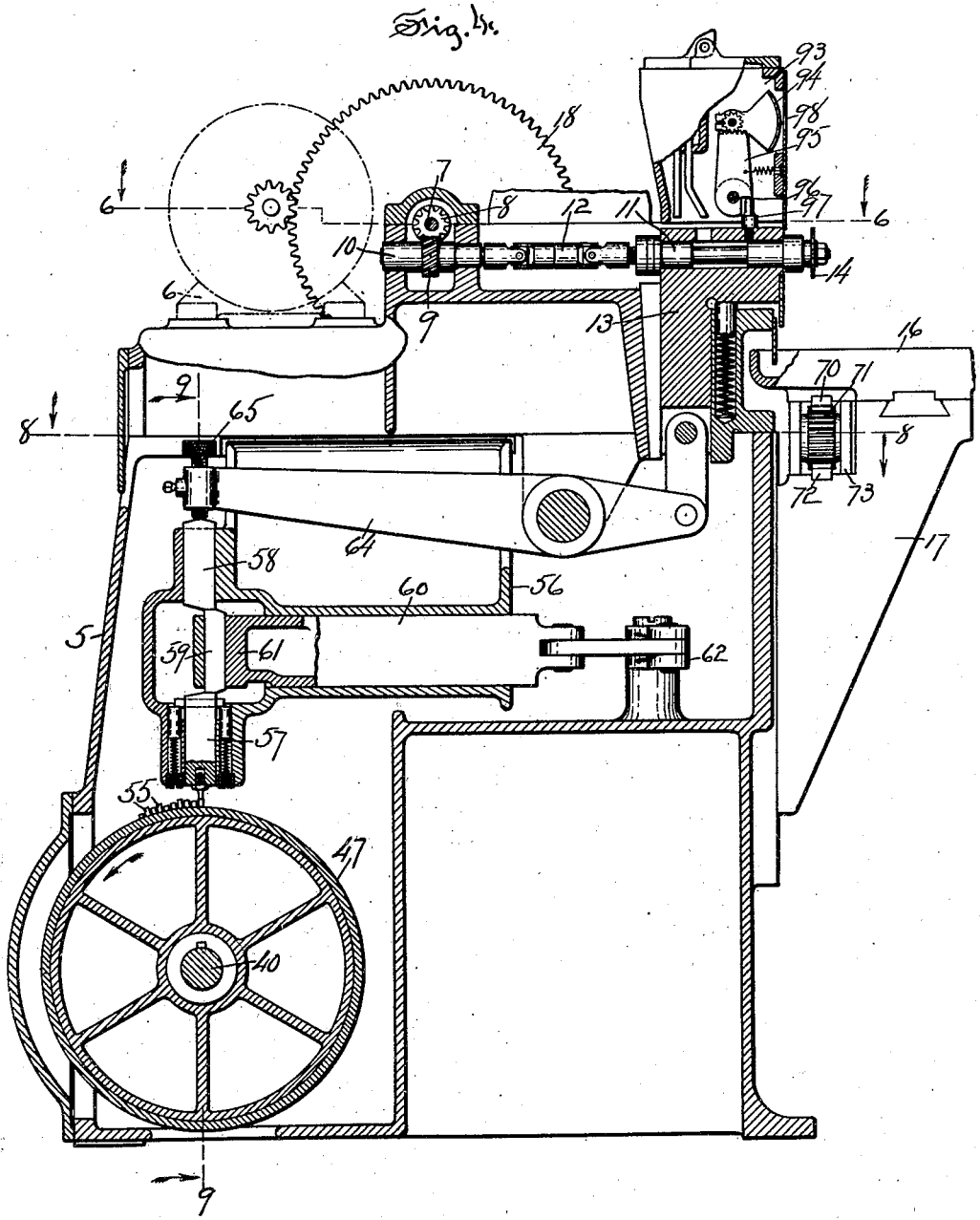
INVENTOR
George A. Long.
By
Arthur B. Jenkins.
ATTORNEY

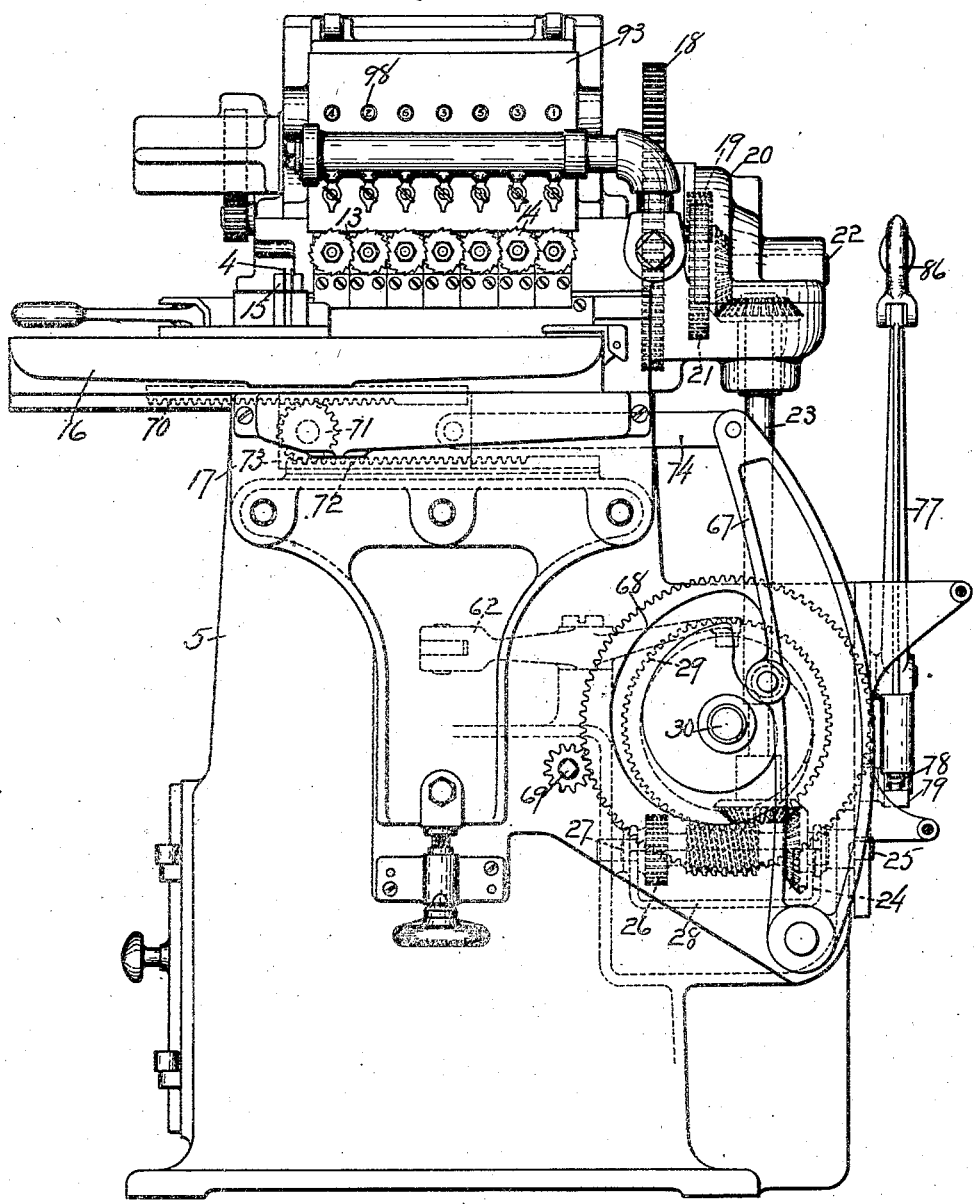

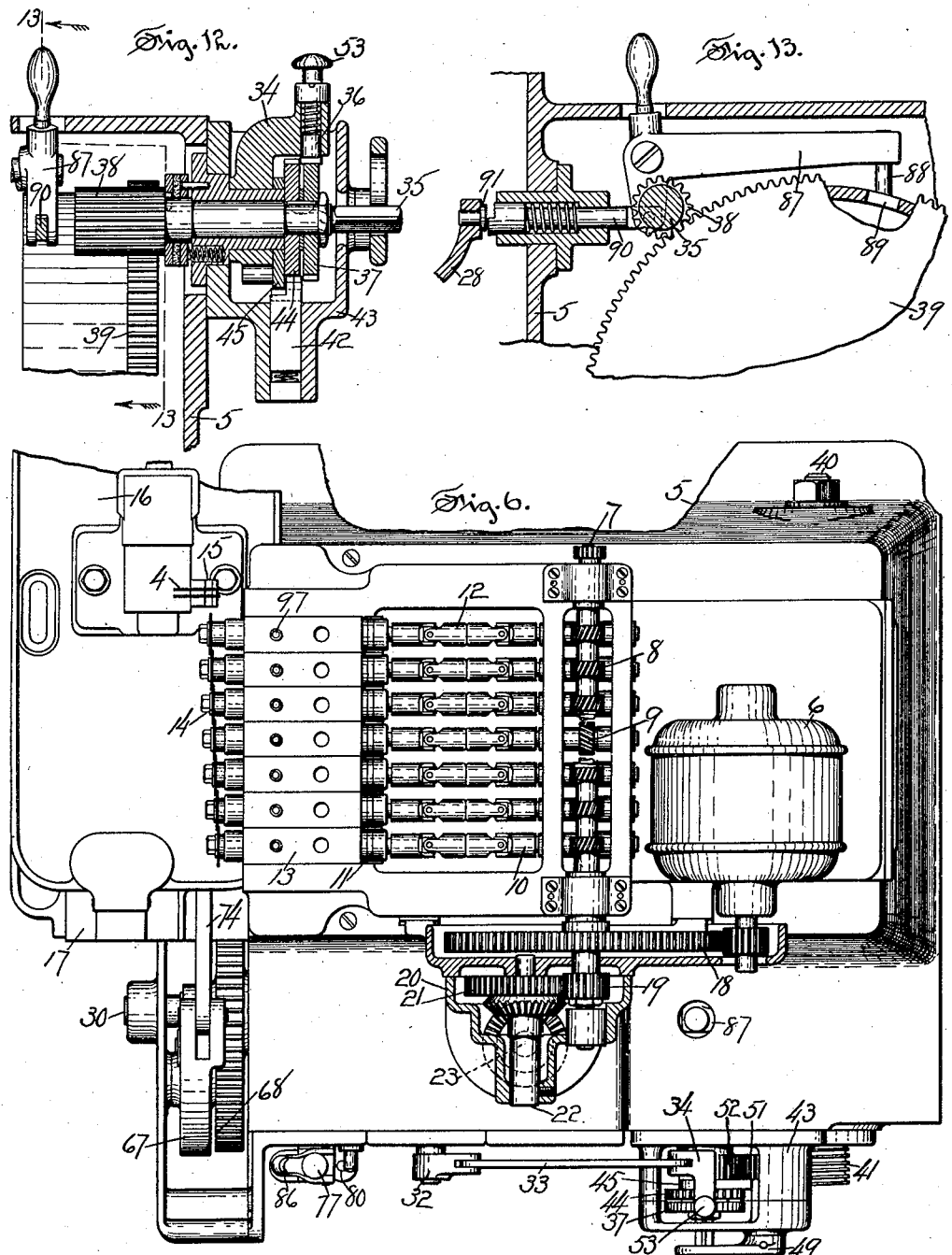

Sept. 5, 1933.  G. A. LONG  1,925,723
KEY CUTTING MACHINE
Filed Jan. 20, 1928  6 Sheets-Sheet 5
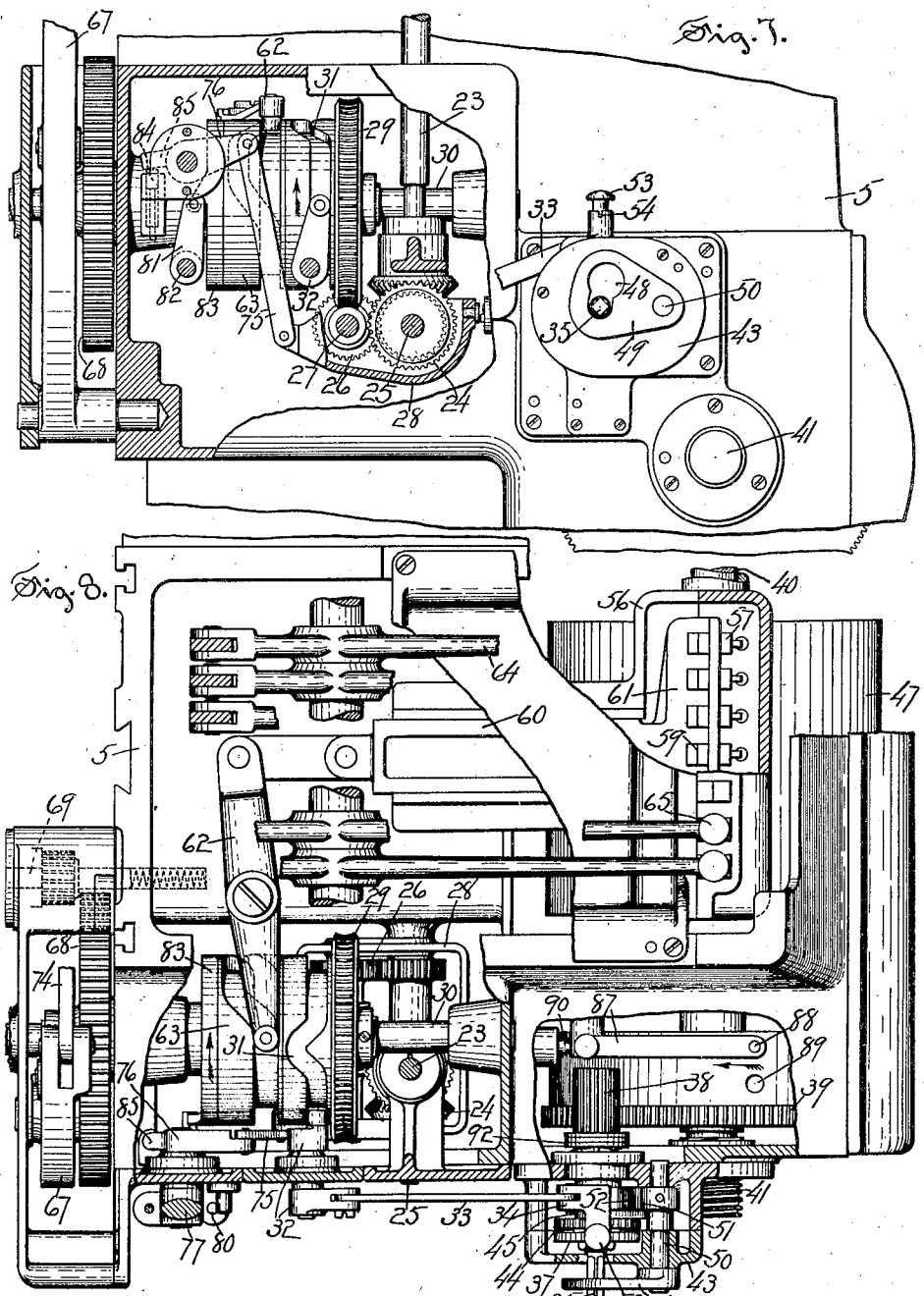
INVENTOR
George A. Long,
By
Arthur B. Jenkins,
ATTORNEY Sept. 5, 1933.   G. A. LONG   1,925,723
KEY CUTTING MACHINE
Filed Jan. 20, 1928   6 Sheets-Sheet 6
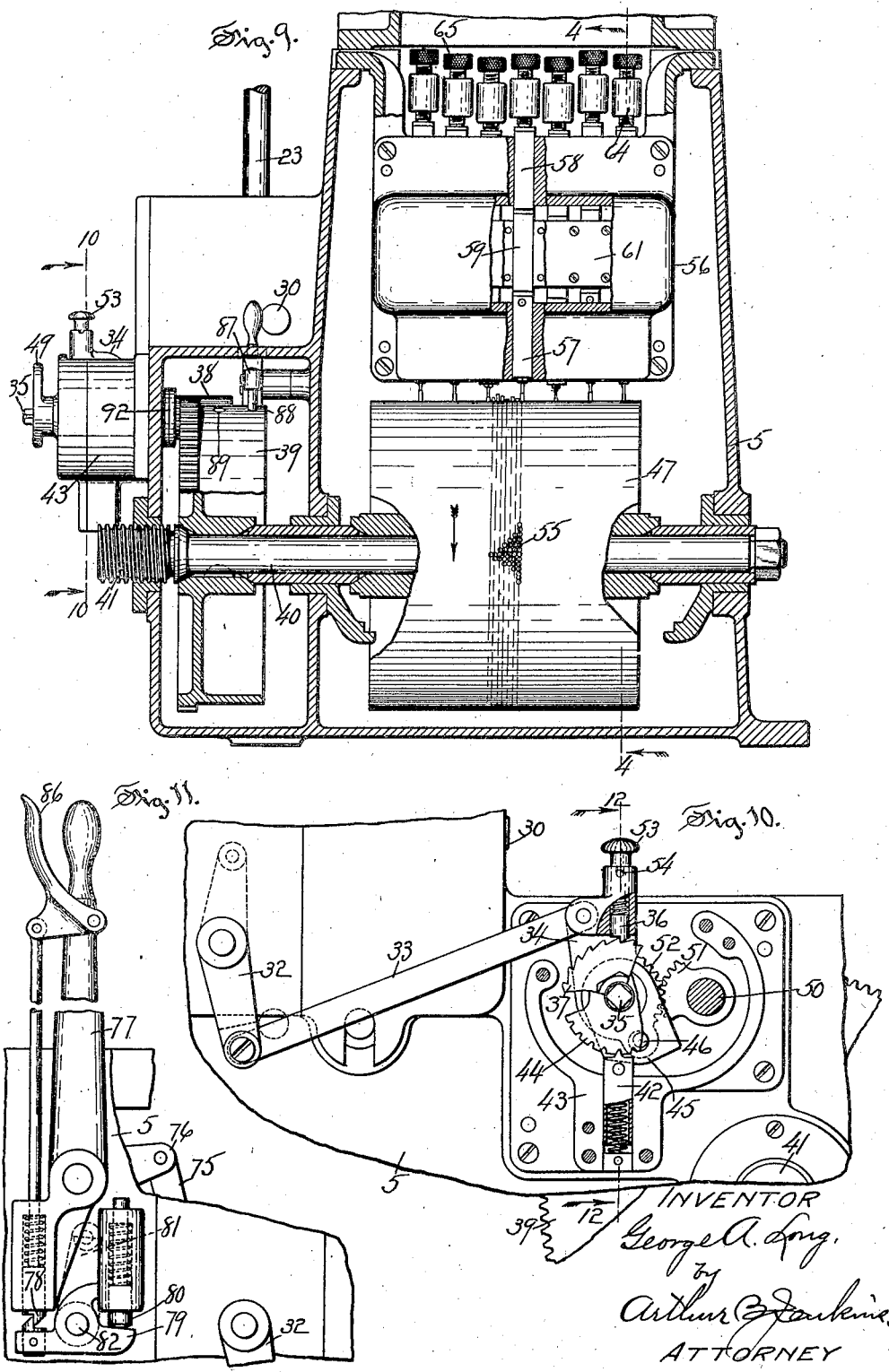

Patented Sept. 5, 1933

1,925,723

UNITED STATES PATENT OFFICE 1,925,723

KEY CUTTING MACHINE

George A. Long, Hartford, Conn., assignor to The Gray Telephone Pay Station Company, Hartford, Conn., a corporation of Connecticut Application January 20, 1928. Serial No. 248,158

44 Claims. (Cl. 90—21)

This invention relates to the class of machines that are employed for notching the edges of key blanks in the manufacture of such keys, and an object of the invention, among others, is the production of a machine of this class having means for automatically changing the position of parts of the machine to produce successively keys having edges of different form, and another object of the invention, is the production of a machine having an indicator by means of which it may be definitely ascertained that the machine in its next operation will produce the key intended.

One form of machine embodying the invention and in the construction and use of which the objects herein set out, as well as others, may be attained, is illustrated in the accompanying drawings, in which—

Figure 1 is a side view of my improved key cutting machine.

Figure 2 is a front view of the same.

Figure 3 is a view on enlarged scale of a key produced as to one edge on my improved machine.

Figure 4 is a view, scale enlarged, in side elevation of my improved machine with parts broken away to show construction.

Figure 5 is a view on enlarged scale looking at the front of the machine.

Figure 6 is a top view, scale enlarged, of one side of the machine showing the driving connections, and on a plane denoted by the dotted line 6—6 of Figure 4.

Figure 7 is a view, scale enlarged, of a portion of the lower part of the machine looking from the right as seen in Figure 2 and with parts broken away to show construction.

Figure 8 is a partial top view of the machine generally on a plane denoted by the dotted line 8—8 of Figure 4, but broken away in different planes to show parts underneath.

Figure 9 is a view in section on a plane denoted by the dotted line 9—9 of Figure 4.

Figure 10 is a view, scale enlarged, of a portion of the machine shown in Figure 7 and taken on line 10—10 of Fig. 9 to show construction of the ratchet mechanism for operating the indexing drum.

Figure 11 is a view, same scale as Figure 10, of a portion of the machine shown in Figure 7, being in fact, an extension of Figure 10 but separated therefrom on account of lack of space.

Figure 12 (Sheet IV) is a view on a plane denoted by the dotted line 12—12 of Figure 10.

Figure 13 (Sheet IV) is a view in section on a plane denoted by the dotted line 13—13 of Figure 12.

My improved key cutting machine in its preferred form embodies a frame made as a case 5 to inclose much of the mechanism, a motor 6 on the top of the case, near the back thereof, being employed for driving purposes, such motor being connected as by means of an intermeshing pinion and gear with a cutter driving shaft 7 mounted on top of the frame and having a set of worm members 8 each meshing with a worm member 9 on a cutter shaft extending transversely of the shaft 7 and embodying a driving section 10 and a driven section 11 connected by a universal joint 12, this arrangement enabling the cutter slides 13, one of which is provided for each cutter, to be relatively changed in positions in vertical directions for the purpose of notching the edges of keys successively cut upon the machine. Cutters 14 are secured to the outer ends of the cutter shafts, there being any suitable number of cutters that may be desired, seven being embodied in the machine shown herein.

The keys or key blanks are secured in a holder 15 of any suitable form fastened to the upper surface of a table 16 mounted for reciprocating movement on a table support 17 secured to the front of the machine, the mechanism for operating said table to be more specifically hereinafter described. The cutters are arranged, as shown in Figure 6, one in advance of another, over an extent of space of a width equal to the length to be cut on the edge of a key blank.

As hereinbefore described the cutter driving shaft is driven as by means of a pinion on the motor shaft meshing with a driving gear 18 on the shaft 7, said shaft also having a driving pinion 19, the whole being mounted in a gear case 20. The pinion 19 engages an intermediate gear 21 on an intermediate shaft 22 mounted in said gear case and having a bevel gear thereon meshing with a bevel gear on a connecting shaft 23 vertically arranged in the frame and having at its lower end a bevel gear meshing with a bevel gear 24 on a short connecting shaft 25. This connecting shaft is mounted in the frame of the machine and has a pinion thereon meshing with a pinion 26 on a disconnecting shaft 27 mounted in the sides of a disconnector 28 in the shape of a pan pivotally mounted on the shaft 25. The shaft 27 has a worm in mesh with a worm wheel 29 secured to a cam shaft 30 mounted in the frame of the machine.

A cam 31, for operating an indexing mechanism, is secured to the cam shaft 30, said cam engaging with one end of a detent operating lever 32 pivotally supported on the side of the frame 5 and having a connecting rod 33 extending from said lever to a detent rocker 34 pivotally supported on an indexing drum actuating shaft 35 mounted in the frame 5, and as shown in Figure 12 of the drawings. A plunger detent 36 is located in an opening on the rocker 34 and is pressed, as by means of a spring, into contact with a ratchet wheel 37 secured to the shaft 35. An indexing drum pinion 38 secured to the shaft 35 meshes with an indexing drum gear 39 secured to an indexing drum shaft 40 rotatably mounted in the frame 5. The shaft 40 is movable lengthwise within the case as by means of a threaded end 41 fitting a threaded hole in said case, or in a collar provided for this purpose, as shown in Figure 9, and the shaft 40 extends through a set of bearing sleeves located in openings in the case, as shown in said Figure 9, said sleeves being longitudinally movable with the shaft 40.

A locking detent 42 is mounted in a detent inclosing case 43 secured to the side of the case 5 and as shown in Figures 10 and 12, this detent 42 being spring pressed to engage its end with a locking disc 44 secured to the shaft 35, and as shown in Figure 12. An unlocking cam 45 has an enlarged opening to receive an unlocking pin 46 projecting from the under side of the rocker 34, and as shown in Figure 10.

It will be noted that the locking detent 42 is normally engaged with the locking disc 44 so that the latter is locked against movement except at the time of operation of the detent 36 to rotate the shaft 35, and an indexing drum 47 secured to the shaft 40 hereinbefore referred to and connected with the shaft 35, is therefore locked against unintentional movement, this being a very important feature of my invention.

In the operation of this detent mechanism when the rocker 34 is moved by the rod 33 to engage the detent 36 with another tooth the pin 46 on the rocker is moved to the opposite side of the enlarged opening in the unlocking cam 45, and said cam is then caused to engage a hardened pin near the end of the locking detent 42 removing the same from engagement with the disc 44. The detent 36 is now in position for its return movement whereby the ratchet wheel 37 is given a one step movement which is communicated to the indexing drum 47.

In this active movement of the detents the pin 46 is moved across the enlarged opening, therefore, without moving, during this interval, the cam 45, this causing the ratchet wheel 37 and the locking disc 44 to be moved so that the locking detent 42 will not engage with said disc until after such movement and, therefore, will not lock said disc until the next notch is reached in this feeding movement of the parts.

The indexing drum 47 has indexing pins 55 arranged in sets, there being one set appurtenant to each cutter 14. Each set comprises a row or rows of pins extending circumferentially around the drum and the pins also extend in rows crosswise of the drum. In the preferred form of construction and as illustrated herein the pins in each set extend circumferentially in the form of a helix, as shown in Figure 9 wherein a few of the pins only are shown, but enough being shown to illustrate the idea. In this figure a single set of pins appurtenant to the center cutter 14 is indicated, a pin or pins also being shown in sets appurtenant to each of the other cutters. As shown in this view, as well as in Figure 4, it will be noted that these pins are of different heights and each pin serves to regulate the position of its appurtenant cutter 14 to determine the height of the flat that will be cut in the key blank in the cutting operation.

The connection between the pins in the drum 47 and the cutters comprises an equalizer mechanism mounted in an equalizer frame 56 rigidly secured inside of the case 5. There are two sets of equalizer plungers mounted in this frame, the positions of the primary set 57 being directly fixed by the pins in the indexing drum and the secondary set 58 being actuated through the interposition of a set of equalizers 59. Each of the plungers 57 has a tip, as shown in Figure 4, adapted to rest upon the ends of the indexing pins 55. This plunger is spring pressed away from the drum. An equalizer slide 60 mounted in the frame 56 has a cross head 61 in which the equalizers 59 are freely movable, each of the plungers 57—58 and the equalizers 59 having beveled surfaces to permit the equalizers to pass between the plungers, as illustrated in Figure 4. The slide 60 is operated as by means of a link connection with an equalizer lever 62 pivotally mounted within the case 5 and as illustrated in Figures 4 and 8 of the drawings. The lever 62 is engaged at one end with an equalizer cam 63 secured to the cam shaft 30.

A cutter positioning lever 64 connects each of the equalizer plungers 57—58 with one of the cutter slides 13, as a means for positioning said slide. An adjusting screw 65 may be placed in the end of each of the levers 64 if desired for adjusting the position of this end with respect to a plunger 58.

From this description, it will be seen that in the operation of the machine, at certain periods, the tips in the plungers 57 are located opposite certain pins 55 in the drum 47, the pins 55 being located successively underneath said tips as the drum 47 is rotated. After the drum 47 has been given a one step movement to bring a new row of pins 55 extending crosswise of the drum underneath the tips in the plungers 57 the lever 62 will be timely operated by the cam 63 to move the equalizer slide 60 to draw the equalizers 59 between the two sets of plungers 57—58. This will separate the plungers, as shown in Figure 4, each bottom plunger resting upon a pin 55.

It will thus be seen that the height of a pin in the drum 47 with which a plunger 57 will make contact will determine the vertical position of the cutter 14 appurtenant to said plunger 57, and at each operation the pins in each row lengthwise of the drum being of different heights the flats 66 on a key 4 will be of different heights.

Correspondingly in the next one step rotation of the drum one or more of the pins in each of the rows around the drum being of a different height from that of the next preceding pin each succeeding key produced by the cutters 14 will differ from the one previously cut and it will thus be seen that a practically endless variety of keys may be produced upon the machine without changing the pins in the drum 47. The cutter slides 13 are spring pressed upwardly, as shown in Figure 4, and the operation of the equalizer mechanism, as just described, determines the location of the cutters 14 in their lowermost position.

The table 16 is reciprocated by means of a table actuating lever 67 pivotally mounted at its lower end on the case 5 and having a roller intermediate its ends engaged in a groove in a table actuating cam 68 secured to the cam shaft 30, and as shown in Figures 5 and 8 of the drawings. This cam 68 has a toothed periphery adapted to engage with a pinion secured to a shaft 69 rotatably mounted in the case and that may be manually operated as by means of a crank (not herein shown) or otherwise as may be desired. The table has a rack 70 on its under surface meshed with the teeth of a table actuating pinion 71 mounted in rolling contact with a rack 72 supported inside of the case 5. The pinion 71 is pivotally attached to and between a pair of sliding bars 73 connected by a link 74 with the upper end of the lever 67.

The cam shaft 30 has one complete rotation in each operation of the machine to cut a key blank and during each of such rotations a one step movement is imparted to the indexing drum 47, the equalizer mechanism effects one complete movement and the table 16 is moved forward and back to begin and complete the operation of cutting a key blank. At the end of the operation of cutting a key blank the rotation of the cam shaft is automatically stopped and the key blank cutting mechanism therefore ceases its operation, this to enable a new blank to be clamped in the holder 15 for a repetition of the cutting operation. This stopping of the machine is effected by lowering the disconnector frame 28 thereby disengaging the worm rotatably mounted thereon from the worm wheel 29, thus interrupting the driving connection for the cam shaft. The disconnector 28 is held in position to engage the worm just described by means of a supporting link 75 attached at its opposite ends to said frame and to one arm 76 of a starting lever, the other arm of said lever constituting a starting handle 77. This starting lever is mounted in the case 5 and the handle 77 has a spring pressed detent 78 adapted to engage with a detent on a stopping rocker 79 pivotally mounted in the case and influenced by a spring pressed plunger 80 to hold said detents engaged one with the other. A stopping arm 81 secured to the pivot 82 of the rocker 79, as shown in Figures 7 and 11, has a pin at its outer end adapted to engage a lobe on a stopping cam 83 secured to the cam shaft 30.

When the cutting of a blank is nearly completed this lobe on the stopping cam encounters the pin in the end of the arm 81 to swing said arm on its pivot, thereby operating the rocker 79 to remove the detent thereon from engagement with the detent 78. This will permit the handle 77 and connected parts to automatically act to effect movement of the disconnector 28 to disengage the worm from the worm wheel 29, as hereinbefore explained, and this operation may be promoted as by means of a spring plunger 84 pressed against a toe 85 projecting from the arm 76 of the starting lever, as shown in Figure 7 of the drawings. The detent 78 may be manually operated for disengagement from its retaining detent as by means of a finger lever 86 pivoted on the upper end of the handle 77 and connected with the detent as by means of a connecting rod in a manner common to structures of this class and as shown in Figure 11 of the drawings.

When the indexing drum 47 has completed an active longitudinal movement, which will end at substantially the time of completion of a rotating movement, and these two movements being finished at about the time of completion of the cutting of the key blank and a stopping of the machine as above described, means are provided to prevent starting of the machine until after the indexing drum shall have again been placed at its starting point, this positioning of the drum at the starting point being effected by rotating it backwardly to cause its threaded end 41 engaged with the threaded opening in the case to effect such movement, thereby placing said drum at the starting point by endwise movement thereof. This mechanism for preventing starting of the machine, as just described, comprises a locking lever 87 pivotally mounted in the case (see Figures 8, 9 and 13) and having a retaining pin adapted to enter a hole 89 in the drum. This lever has an operating handle, as shown in Figure 13, and its downwardly extending end opposite the pin 88 is pivotally attached to a locking spring pressed plunger 90 having a shouldered end adapted to pass underneath the head of a locking pin 91 on the disconnector 28 when said pin is raised after having been lowered at the time of stopping the machine, as hereinbefore described.

It will be noted that the step-by-step movement of the drum 47 effected by the detent feed mechanism comprising said detent 36 causes the drum 47 through the action of the threaded end 41 on its shaft, to be moved slowly endwise and that eventually the drum will reach its limit of such movement. It then becomes necessary to move the drum to the opposite limit of its play, as hereinbefore described, that is, to the starting point for a repetition of its active movement. Means are therefore provided for manually operating the machine, or a portion thereof, to move the drum backwardly for the purpose described, or for any other reason.

To do this the end of the shaft 35 is formed to receive a socket crank, the socket on which is of a size to enter an enlarged part 48 of a key hole opening in a guard plate 49 pivotally supported on the inclosing case 43, and as shown in Figures 7 and 8. A guard actuating shaft 50 extends into the case 43 and has a toothed segment 51 engaged with a toothed segment 52 on the rocker 34.

When it is desired to manually operate this mechanism to turn the indexing drum it is first necessary to swing the guard plate 49 so that the socket crank hereinbefore referred to may be placed on the end of the shaft 35 through the enlarged opening 48, but in order to do this the cam shaft 30 must be turned. The application of a crank to the end of the shaft 69, as hereinbefore referred to, will be found a convenient way of doing this. This manual rotation of the cam shaft through the connecting mechanism therefrom to the rocker 34 will swing the latter forward, and through the operation of the segments 51 and 52 the shaft 50 will be turned, thus swinging the guard plate downwardly from the position in Figure 7 so that a crank may be placed on the end of the shaft 35 through the enlarged part 48 of the opening in said guard plate. This operation of the rocker also swings the unlocking cam 45 to release the detent 42 from engagement with the locking disk 44, and all that is now required is to disengage the detent 36 from the ratchet wheel 37 which may be done by lifting the detent by means of the button 53, thus disengaging the locking pin 54 from its notch in the rocker (see Figure 10) and the button being turned the detent is prevented from reengaging the teeth of the ratchet wheel until the button is again turned to permit the pin 54 to reenter its notch. The shaft 35 and the pinion 38 thereon are now free to be turned by means of the crank to rotate the indexing drum 47 in either direction, but particularly backward to place the drum 47 at the starting point, as hereinbefore referred to.

In order to prevent the indexing drum from being relatively moved with respect to the driving mechanism therefor a brake 92 (see Figure 9) of any suitable kind is located on the shaft 35 and acts between said shaft and the case or frame to restrain movement of said shaft and the parts connected therewith.

It is common practice in the cutting of keys to give each key a number which may be referred to as a key number, this being permanently placed upon the key and each key number is different from that of any other key in a series or number of series. Another number, that may be referred to as a shape number, is designated for that key, this second number having special reference to the flats or notches 66 upon the key 4. Each numeral in the shape numbers designates the distance from the back of the key to a certain flat. A record is kept giving the key numbers and the shape number associated with each key number. Therefore, a key number being given it may be readily determined from the shape number what the form of the edge of the key should be, that is, the relative location of the flats with respect to each other will become apparent.

In order that each key cut upon the machine shall have its edge of the shape intended and to correspond with the key number of a particular key, means are provided in this improved machine whereby the operator may determine, before the key is cut, that the edge will be of the shape intended. This is in the form of a register case 93 visible at the front of the machine and comprising a plurality of registering plates 94, preferably of curved form separately pivotally mounted in the case 93. Each plate bears a series of numbers, as herein shown these numbers ranging from one to seven, to correspond with the number of flats which the machine is adapted to form upon the edge of a key blank. Each plate has a pinion in mesh with a rack on the end of a plate actuator 95, as herein shown in the form of an arm pivotally mounted in the case and having a shoulder 96 engaged by an actuating pin 97 projecting from the upper edge of a cutter slide 13. The numbers on the register plates may be seen through windows 98 in the front of the register case, and as shown in Figures 2, 4 and 5 of the drawings.

From this it will be noted that the pivotal position of each plate 94 is governed by the position of its cooperative cutter slide 13, and the position of the latter, therefore, will govern and determine the number visible through a window 98.

To start the machine, when a key, or number of keys, is or are clamped in the holder 15 the handle 77 is manually operated to start the key cutting mechanism. The table 16 in the operation of the machine is moved to the right from the starting position shown in Figures 2 and 5, thus passing the key blanks underneath the cutters 14, thereby forming key flats and notches in said keys. Before starting the machine the operator by noting the numerals through the windows 98 and comparing them with a list which he has before him may determine that the machine in its next operation will form the edge of the key blank to correspond with the key number. When the table 16 reaches the limit of its cutting movement, that is to the right, the cam 68 will reverse the movement of the table and return it rapidly to its starting point. Before this return or idle movement the cam 63 operates the equalizer mechanism, causing rearward movement of the equalizer slide 60, this effecting a raising of all of the plungers 57 during this rearward movement of the table 16, and the indexing cam 31 effects a one step movement of the indexing drum 47, the indexing pins 55 on which are clear of the plungers 57 by reason of the latter having been raised, as just described. This operation of the equalizer mechanism effected a raising of all of the cutter slides 13, lifting the cutters 14 above the plane of the edge of the keys which have just been cut, and this raising of the slides 13 effected a movement of all of the actuators 95 against the influence of their springs, as shown in Figure 4 of the drawings. This operation moved all of the plates 94 downwardly so that no numerals are visible through the windows 98.

As the table 16 reaches the limit of its return movement the lobe on the cam 83 encounters the stopping arm 81 on the rocker pivot 82 (see Figures 7, 8 and 11) thereby swinging said rocker to disengage its detent from the detent 78. This permits the handle 77 and arm 76 to turn on their pivot, thereby actuating the link 75 to permit downward movement of the disconnector 28, thus disconnecting the worm on the shaft 27 from the worm wheel 29 and stopping the operation of the key forming mechanisms. Before this stopping operation, however, and just after indexing movement of the drum 47, the cam 63 actuates the equalizer levers 62 to pass the equalizers 59 between each of the pairs of plungers 57—58, thereby placing the cutter slides 13 and the cutters thereon in proper position for the next cutting operation. This action also places the register plate 94 with the numerals thereon in correct position before the window 98.

Some lubricating apparatus including pipes, a pump 99, etc., are shown in the drawings herein, but they do not form a part of the present invention and a detailed description thereof has been omitted.

Other apparatus, such as aprons, guards, etc., to protect certain parts of the mechanism from dirt have not been herein specifically described, altho they have been shown to represent the machine as it would be actually constructed.

I claim—

1. A cutting machine including a movably mounted support, a cutter mounted thereon, a member having positioning elements of various forms arranged thereon, means to move said member to successively place the elements in a predetermined position, an operative connection for moving said support and controlled by said elements, said connection including a holder, an equalizer movable to change its position on said holder, means for moving said holder to place the equalizer in position for operation by said positioning elements, the positions of said equalizer being determined by the form of said elements, and means actuated by said equalizer for moving said support.

2. A cutting machine including a movably mounted support, a cutter mounted thereon, a rotatable member having positioning elements of various forms arranged in a helical line thereon, means to rotate said member to successively place the elements in a predetermined position, an operative connection for moving said support and controlled by said elements, said connection including a holder, an equalizer freely movable to change its position on said holder, means for moving said holder to place the equalizer in an effective and operative position, the position of said equalizer being determined by the form of said elements, and means actuated by said equalizer for moving said support.

3. A cutting machine including a movably mounted support, a cutter mounted thereon, a member rotatably and longitudinally mounted and having a plurality of sets of positioning elements of various forms arranged thereon, means to longitudinally and rotatably move said member to successively place the elements in a predetermined position, an operative connection for moving said support and controlled by said elements, said connection including a holder, an equalizer freely movable to change in position on said holder, means for moving said holder to place the equalizer in an effective and operative position, the position of said equalizer being determined by the form of said elements, and means actuated by said equalizer for moving said support.

4. A cutting machine including a plurality of movably mounted supports, a cutter mounted on each support, a rotatably mounted member having positioning elements of various forms arranged thereon appurtenant to each of said supports, means to rotate said member to successively place the elements in predetermined positions, an operative connection for moving each of said supports and controlled by said elements, said connections including a holder, an equalizer appurtenant to each support and freely movable to change its position on said holder, means for moving said holder to place the equalizer in an effective and operative position, the positions of said equalizers being determined by the form of said elements, and means actuated by said equalizers for moving said supports.

5. A cutting machine including a plurality of movably mounted supports, cutters mounted thereon, a member rotatably and longitudinally mounted and having a plurality of sets of positioning elements of various forms arranged in helical lines thereon, means for producing longitudinal and rotating movements of said member to successively place the elements in predetermined positions, an operative connection for moving said supports and controlled by said elements, said connections including a holder and each connection including an equalizer freely movable to change its position on said holder, means for moving said holder to place an equalizer in an effective and operative position, the positions of said equalizer being determined by the form of said elements, and means actuated by said equalizers for moving said supports.

6. A key cutting machine including a movably mounted support, a cutter mounted thereon, a rotatably mounted indexable member having indexing pins of various lengths arranged thereon, means for rotating said member to successively place the elements in a predetermined position, an operative connection for moving said support and controlled by said elements, said connection including a holder, an equalizer freely movable to change its position on said holder, means for moving said holder to place the equalizer in an effective and operative position, the position of said equalizer being determined by the length of said elements, and means actuated by said equalizer for moving said support.

7. A key cutting machine including a movably mounted support, a cutter mounted thereon, a longitudinally movable member having positioning elements of various lengths projecting from its surface, means to move said member to successively place the elements in a predetermined position, an operative connection for moving said support and controlled by said elements, said connection including a holder, an equalizer freely movable to change its position on said holder, means for moving said holder to place the equalizer in an effective and operative position, the position of said equalizer being determined by the form of said elements, and means actuated by said equalizer for moving said support.

8. A key cutting machine including a plurality of movably mounted supports, a cutter mounted on each of said supports, a rotatably mounted indexable member having a set of indexing pins of various lengths projecting from its surface, means to rotate said member to successively place said pins in a predetermined position, an operative connection for moving said support and controlled by said pins, said connection including a holder, and each connection including an equalizer freely movable to change its position on said holder, means for moving said holder to place the equalizers in effective and operative positions, the positions of said equalizers being determined by the form of said indexing pins, and means actuated by said equalizers for moving said supports.

9. A key cutting machine including a plurality of movably mounted supports, cutters mounted on said supports, a longitudinally movable indexable member having a set of indexing pins of various lengths arranged thereon, and appurtenant to each of said cutters, means to move said member to successively place said pins in a predetermined position, an operative connection for moving said support by the operation of one of said sets of pins, said connection including a holder, an equalizer freely movable to change its position on said holder, means for moving said holder to place an equalizer in an effective and operative position, the position of said equalizer being determined by the length of said pins, and means actuated by said equalizer for moving said support.

10. A key cutting machine including a movably mounted support, a cutter operatively mounted thereon, said cutter support being moved between predetermined limits so as to position its cutter for making cuts of desired depths, an indexable member rotatably mounted and having a screw threaded engagement with a fixed part, indexing pins of various lengths arranged in a spiral line on the surface of said member, means for rotating said member, an operative connection between said support and said member for moving said support, said connection including a holder, an equalizer movably mounted in said holder to freely assume different positions required by said pins on said member, and means for operating said holder to cause the equalizer to effect the placing of said cutter in the positions determined by said pins.

11. A key cutting machine including a plurality of movably mounted cutter supports with cutters operatively mounted thereon, said cutter supports being moved between predetermined limits so as to position their cutters for making cuts of desired depths, a rotatably mounted indexable member having a screw threaded engagement with a fixed part, means for rotating said member, a set of indexing pins of various lengths extending in a helical line around said member to determine different positions of each of said cutters, an operative connection between each of said supports and one of said sets of pins for moving said support, each of said connections including a holder an equalizer movably mounted in said holder to freely assume different positions required by said pins, and means for operating said holding means to cause the equalizer to effect the placing of said cutters in the positions required by said pins.

12. A key cutting machine including a movably mounted cutter support with a cutter operatively mounted thereon said cutter support being moved between predetermined limits so as to position its cutter for making cuts of desired depths, an indexable member having positioning means to determine various cutting positions of the cutter, means for imparting setting movement to said member, and an operative connection between said support and said member for moving said support, said connection including an equalizer with elements thereon movable to positions to constitute a rigid link in said connection to suit varied conditions imposed by said positioning means in said indexing member, means for temporarily changing the position of said equalizer after a cutting operation of said cutter and for repositioning said equalizer for a cutting operation after resetting of said indexing member.

13. A key cutting machine including a movably mounted cutter support, a longitudinally axially and rotatably movable indexable member movable at the end of each complete key cutting operation only and having means sucessively positioned by such movement for imparting a different degree of movement to said cutter support at each successive movement of said indexable member to place said cutter in a different cutting position at each movement thereof, an operative connection between said support and indexable member, and means for imparting a step-by-step movement to said indexable member.

14. A key cutting machine including a movably mounted cutter support with a cutter operatively mounted thereon said cutter support being moved between predetermined limits so as to position its cutter for making cuts of desired depths, an indexable member having means to determine various cutting positions of the cutter, means for imparting setting movement to said member, and an operative connection between said support and said member for moving said support, said connection including a positioning member, an equalizer between said indexing member and said positioning member, said equalizer having elements to effect rigid links in said connection, means for temporarily changing the position of said equalizer after a cutting operation by said cutter and for repositioning said equalizer for a cutting operation after resetting of said indexing member.

15. A key cutting machine including a movably mounted cutter support with a cutter operatively mounted thereon said cutter support being moved between predetermined limits so as to position its cutter for making cuts of desired depths, an indexable member having means to be operatively connected with said cutter to determine various cutting positions thereof, means for imparting setting movement to said member, an operative connection between said support and said member for moving said support, said connection including an equalizer mechanism comprising separated sections movable in different zones to relatively different positions, and means for imparting relative movement to said sections after a resetting movement of said indexing member to rigidly connect them for operation of said cutter.

16. A key cutting machine including a movably mounted cutter support with a cutter operatively mounted thereon said cutter support being moved between predetermined limits so as to position its cutter for making cuts of desired depths, an indexable member having means to be operatively connected with said cutter to determine various cutting positions of the cutter, means for imparting setting movement to said member, and an operative connection between said support and said member for moving said support, said connection including a sectional equalizer mechanism having sections movable to different relative positions, and means for operating said sections to temporarily destroy said connection to allow operation of said indexing member and to restore said connection after a resetting of said member.

17. A key cutting machine including a movably mounted cutter support with a cutter operatively mounted thereon said cutter support being moved between predetermined limits so as to position its cutter for making cuts of desired depths, an indexable member having means to determine various cutting poistions of the cutter, means for imparting setting movement to said member, and an operative connection between said support and said member for moving said support, said connection including equalizer plungers relatively movably mounted one with respect to the other, an equalizer movable to effect operative positioning of said plungers, and means for operating said equalizer.

18. A key cutting machine including a movably mounted cutter support with a cutter operatively mounted thereon said cutter support being moved between predetermined limits so as to position its cutter for making cuts of desired depths, an indexable member having means to determine various cutting positions of the cutter, means for imparting setting movement to said member, and an operative connection between said support and said member for moving said support, said connection including equalizer plungers relatively movably mounted one with respect to the other, an equalizer movably mounted to adjust its position to suit various positions of said plungers and also movably mounted to establish an operative connection between said sections, and means for operating said equalizer.

19. A key cutting machine including a movably mounted cutter support with a cutter operatively mounted thereon said cutter support being moved between predetermined limits is as to position its cutter for making cuts of desired depths, an indexable member having means to determine various cutting positions of the cutter, means for imparting setting movement to said member, an operative connection between said support and said member for moving said support, said connection comprising a plurality of parts including an equalizer freely longitudinally movable to suit changes in positions of other parts of said connection, and means for moving said equalizer transversely to establish an operative connection between said member and said support.

20. A key cutting machine including a movably mounted cutter support with a cutter operatively mounted thereon said cutter support being moved between predetermined limits so as to position its cutter for making cuts of desired depths, an indexable member having means to determine various cutting positions of the cutter, an equalizer frame a connection between said support and member including, equalizers spaced apart and movably mounted in said frame, a cross head movably mounted in said frame, an equalizer freely movably mounted in said cross head to be positioned between said plungers, and means for operating said cross head.

21. A key cutting machine including a plurality of movably mounted cutter supports with cutters operatively mounted thereon, means for changing the relative positions of said supports, a register member having a plurality of different numerals thereon and appurtenant to each support, said members being arranged side by side with the numerals displayed in a line to be read as a single number a pivoted rack and pinion connection between each of said supports and its appurtenant register number to place each of the numerals successively in in different initial positions determined by the initial position of the cutter, appurtenant to such number, and means for simultaneously operating said cutter supports to effect setting of said register members.

22. A key cutting machine including a plurality of movably mounted supports with cutters operatively mounted thereon, means for changing the operative positions of said supports, a pivotally mounted register member having a plurality of different numerals thereon, a case having a window through which said numerals are displayed in line, a pivotally mounted arm located in the path of movement of each of said supports to position it in different initial positions, and a geared connection between said arm and said register member.

23. A key cutting machine including a movably mounted cutter support, an indexable member having indexing pins and movable axially and rotatably in opposite directions, operative connections between said support and the successively positioned pins on said member, mechanism connected with said indexable member to operate it, a rotatably mounted shaft operatively connected with said mechanism and having means for attachment of a manually operable member, means for mechanically driving said shaft to rotate and axially move the member in one direction, and means for disconnecting said driving means from said shaft to permit action of said manually operable member to rotate and axially move the member in the opposite direction.

24. A key cutting machine including a movably set cutter, a movably mounted indexable member for governing the setting of the cutter, an operative connection between said cutter and member, mechanism connected to and with said indexing member to operate it, a rotatably mounted shaft operatively connected with said mechanism and having means for attachment of a manually operable member, a guard to prevent and to permit attachment of said manually operable member, means for mechanically driving said shaft, an operative connection between said driving means and said guard, and means for disconnecting said driving means from said shaft to permit action of said manually operable member.

25. A key movably set cutting machine including a cutter, a movably mounted indexable member for governing the setting of the cutter, an operative connection between said cutter and member, mechanism operatively connected with said indexing member to operate it, a rotatably mounted shaft operatively connected with said mechanism and having means for attachment of a manually operable member, a guard to prevent and to permit attachment of said manually operable member, guard operating means, means for mechanically driving said shaft, an operative connection between said driving means and said guard operating means, and means for disconnecting said driving means from said shaft.

26. A key movably set cutting machine including a cutter, a movably mounted indexable member for governing the setting of the cutter, an operative connection between said cutter and member, mechanism operatively connected with said indexing member to operate it, a rotatably mounted shaft connected with said mechanism, a rocker, ratchet and detent mechanism actuated by said rocker to rotate said shaft, means for attachment of a manually operable member to said shaft, a guard to prevent and to permit attachment of said manually operable member, a guard operating shaft operatively connected with said rocker, driving means for said rocker, means for disconnecting said ratchet and detent mechanism from said shaft, and manually operable mechanism for said driving means.

27. A key movably set cutting machine including a cutter, an indexable member having a limited movement for governing the setting of the cutter, an operative connection between said cutter and indexable member, mechanism for operating said indexing member, means for starting and stopping the operation of said mechanism, and means controlled by the movement of said indexable member and connected with said starting means to control starting operation of the machine.

28. A key cutting machine including a movable cutter, a rotatably mounted indexable member having indexing pins and a limited longitudinal movement for successively setting said pins, an operative connection between said cutter and indexable member to cause different settings of the pins to differentially move the cutter, mechanism for imparting rotation and longitudinal movement to said indexing member, means for starting and stopping the operation of said mechanism, and means controlled by longitudinal movement of said indexable member and connected with said starting means to control starting movement of the machine.

29. A key cutting machine including a cutter, a rotatably mounted indexable member having indexing pins and a limited longitudinal movement for successively setting said pins, an operative connection between said indexable member and cutter to cause different settings of the pins to differentially move the cutter, mechanism for rotating said indexable member and for imparting longitudinal movement thereto, this including a rotatably mounted member having a hole therein, means for stopping the operation of said mechanism, and a locking member operatively connected with said stopping means, said locking member including a pin adapted to enter said hole in said rotatable member at the completion of a rotation thereof and at the end of the longitudinal movement of said indexing member.

30. A key cutting machine including a reciprocally and rotatably mounted cutter, a blank supporting table positioned in a plane parallel with the cutter axis, a cam shaft an operative connection between said cam shaft and table for reciprocating the latter, an indexable member including successively active pins of different heights, an operative connection between the pins of said indexable member and said cutters for determining the reciprocal position of the latter, means for intermittently stopping movement of said indexable member and a connection between said cam shaft and said indexable member to operate the latter.

31. A cutting machine including a movably mounted cutter support with a cutter operatively mounted thereon, an indexable member rotatably and longitudinally axially movable and having a plurality of sets of positioning elements variously arranged on its periphery and successively set by said movements to determine different cutting positions of the cutter to cut notches of different depths in key blanks at the end of each complete key cutting operation only, means for producing axial and rotating movements of said member, and an operative connection between said support and said member which produces movement of the support in accordance with the setting of said member.

32. A cutting machine including a plurality of movably mounted cutter supports with cutters operatively mounted thereon, an indexable member rotatably and longitudinally movable at the end of each complete key cutting operation only and having a plurality of sets of positioning elements of different forms variously arranged in helical lines and successively set by said movements to determine different cutting positions of said cutters to successively cut notches of different depths in key blanks, means for producing longitudinal and rotating movements of said member, and an operative connection between each of said supports and said member to rigidly connect them for operation of said cutters.

33. A key cutting machine including a movably set cutter, a movably mounted table to receive a key blank for operation thereon by said cutter, a cam shaft, a connection between said cam shaft and table for operation of the latter, an indexable cutter setting member, an operative connection between said indexable member and cutter including sectional equalizer mechanism, means for intermittently rigidly connecting the sections of said equalizer and a connection beween one of the sections of said equalizer mechanism and the cam shaft for operation of the former.

34. A key cutting machine including a movably set cutter, a table movably mounted underneath said cutter to receive a key blank for operation of the cutter, means for operating the table, a cam shaft, means for operating the cam shaft, an indexable cutter setting member, an operative connection between said indexable member and cutter and including an equalizer mechanism, said mechanism including a holder and an equalizer mounted therein, a connection between said cam shaft and said holder for operation of the latter, and a connection between said cam shaft and said indexable member for operation of the latter.

35. A key cutting machine including a cutter, a rotatably mounted indexable member having a step-by-step limited longitudinal movement progressively in one direction at the end of a complete key cutting operation only, an operative connection between said cutter and indexable member, mechanism for imparting rotation and longitudinal movement to said indexable member, and means for stopping the operation of said mechanism.

36. A key cutting machine including a plurality of cutters, a movably mounted slide for each of said cutters, an indexable member having positioning elements of various forms arranged thereon, cutter positioning levers operatively connected with each of said slides, an equalizer mechanism interposed between said indexable member and said positioning levers for operation of the latter to position said slides said mechanism including a holder and equalizers mounted thereon, and means for operating said holder to place said equalizers in operative positions fixed by said positioning elements to determine the cutting positions of said slides.

37. A key cutting machine including a plurality of cutters, a movably mounted slide for each of said cutters, an indexable member having position elements of various forms arranged thereon, a cutter positioning lever operatively connected with each of said slides, an equalizer mechanism interposed between said indexable member and said positioning levers for operation of the latter, said equalizer mechanism comprising an equalizer slide, equalizers appurtenant to each of said levers and freely movably mounted in said slide, and means for operating the slide to place said equalizers in operative positions fixed by said positioning elements to determine the cutting positions of said slides.

38. A key cutting machine including a plurality of cutters, a movably mounted slide for each of said cutters, an indexable member having positioning elements of various forms arranged thereon, cutter positioning levers operatively connected with each of said slides, equalizer mechanism interposed between said indexable member and said lever for operation of the latter, said mechanism including a frame, a set of sectional equalizer members movably mounted in said frame appurtenant to each of said levers, an equalizer slide, an equalizer freely movably mounted in said slide between the members of each of said sets of equalizers, and means for operating the slide to place said equalizers in operative positions fixed by said positioning elements to determine the cutting positions of said slides.

39. A cutting machine including a movably mounted cutter support, a cutter operatively mounted thereon said cutter support being moved between predetermined limits so as to position its cutter for making cuts of desired depths, a member to determine various cutting positions of the cutter, an operative connection between said support and said member, said connection including a holder, an equalizer freely movable to change its position in said holder to accord with different conditions required by said member, and means for positively operating said holder to position the equalizer to effect the placing of said cutter in the position determined by said member.

40. A cutting machine including a movably mounted cutter support with a cutter operatively mounted thereon said cutter support being moved between predetermined limits so as to position its cutter for making cuts of desired depths, a member having positioning elements of various forms arranged thereon to determine various cutting positions of the cutter, an operative connection between said support and said member, said connection including a carrier and an equalizer loosely mounted thereon and engaged with other parts of the connection to freely assume different positions required by the elements on said member, and means for operating said carrier to operate the equalizer to tighten said engagement and thereby effect the placing of said cutter in the position determined by said member.

41. A cutting machine including a movably mounted cutter support with a cutter operatively mounted thereon, a member having positioning elements of various forms arranged thereon to determine various cutting positions of the cutter, an operative connection between said support and said member, said connection including a carrier and an equalizer mounted thereon and freely movable in one direction to assume different positions required by the elements on said member, and means for operating said carrier to move said equalizer in a transverse direction to effect the placing of said cutter in the position determined by said member.

42. A cutting machine including a plurality of movably mounted cutter supports with a cutter operatively mounted on each of the same, a rotatably mounted indexable member having a multiplicity of indexing pins of various lengths extending from the periphery thereof, a train of mechanical elements operatively connecting each cutter support with the rotatable member so that the cutter supports will be variously arranged in accordance with the positioning of the index pins on said member, each of said trains of mechanical elements including a disconnecting member operating to break said connection and thereafter restore it with the members in different relative positions, and a device common to all of said trains for operating said disconnecting member.

43. A key cutting machine including a movably mounted support with a cutter operatively mounted thereon, an indexable member rotatably mounted and having a screw threaded engagement with a fixed part, indexing pins of various lengths arranged in a spiral line on the surface of said member, means for rotating said member, and an operative connection between said support and said member.

44. A key cutting machine including a plurality of movably mounted cutter supports with cutters operatively mounted thereon, a rotatably mounted indexable member having a screw threaded engagement with a fixed part, means for rotating said member, a set of indexing pins of various lengths extending in a helical line around said member to determine different positions of each of said cutters, and an operative connection between said supports and one of said sets of pins.

GEORGE A. LONG.